3,381,701
SWITCHLESS ELECTROTHERMAL ACTUATOR WITH CONSTANT ELECTRICAL CURRENT INPUT
John F. Sherwood, Wheat Ridge, and Andrew W. Zmuda, Denver, Colo., assignors to Thermal Hydraulics Corporation, a corporation of California
Filed Dec. 2, 1964, Ser. No. 415,330
7 Claims. (Cl. 137—339)

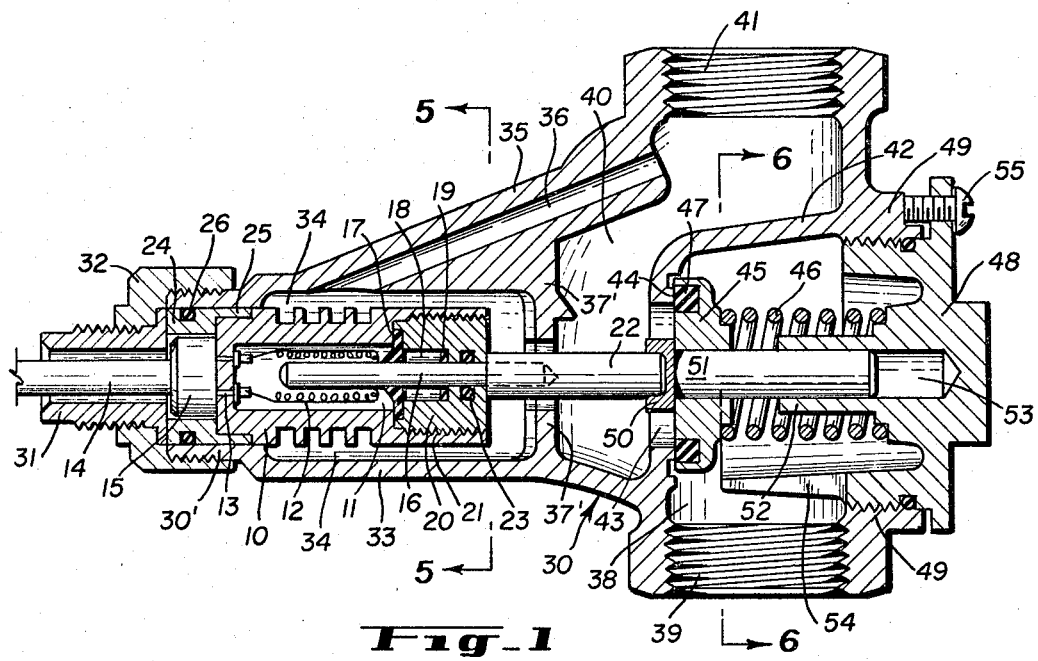
Fig_1
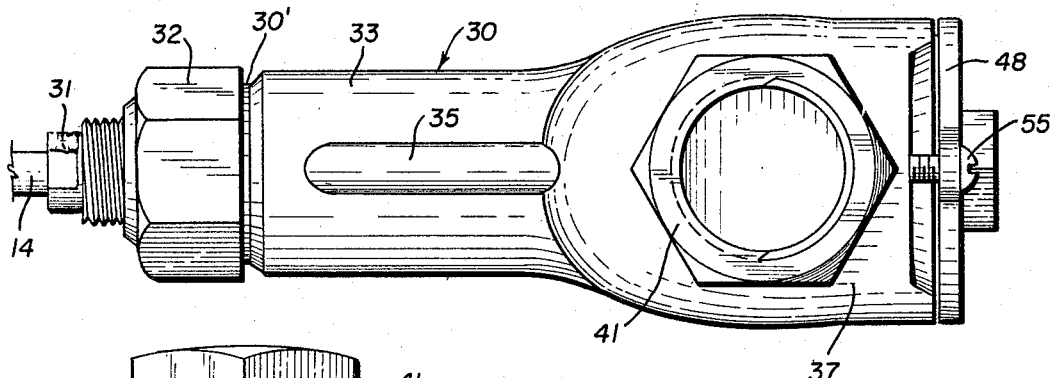
Fig_2
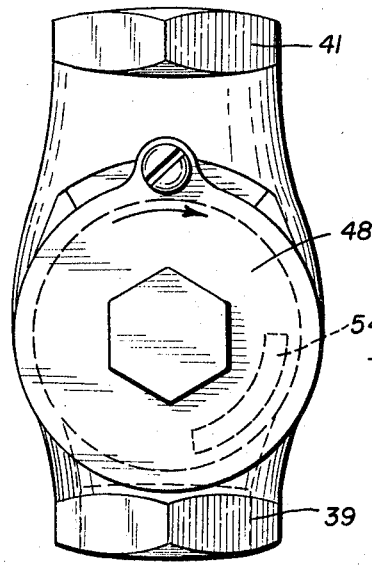
Fig_3
INVENTORS.
John F. Sherwood
Andrew W. Zmuda
BY
Bertha L. MacGregor
ATTORNEY

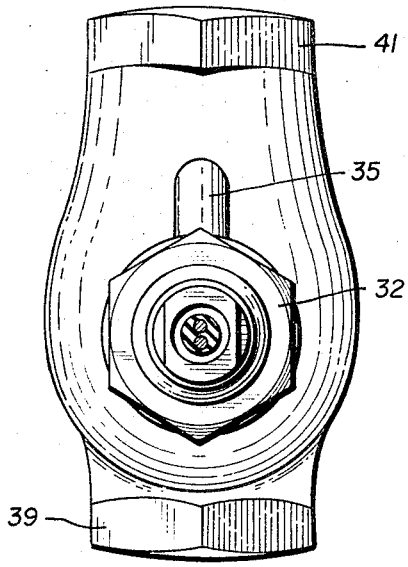
Fig_4
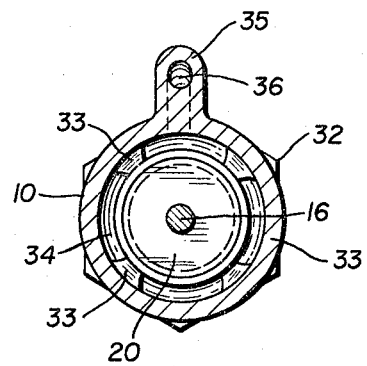
Fig_5
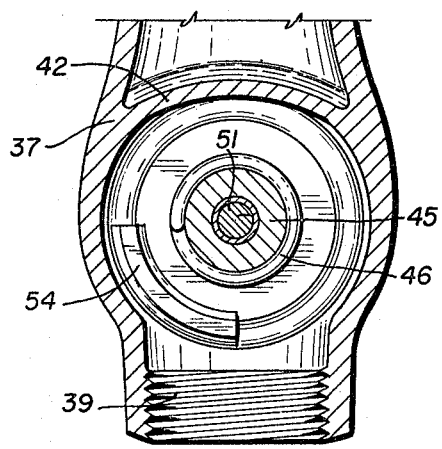
Fig_6
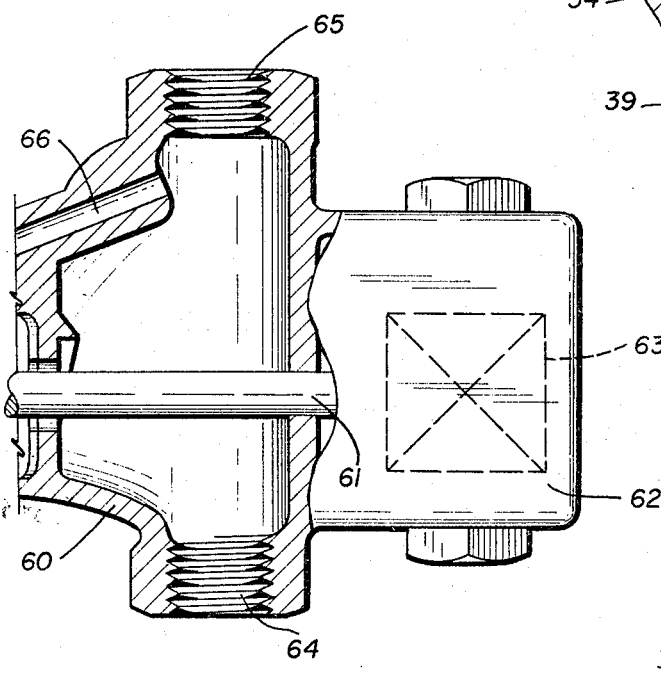
Fig_7
INVENTORS.
John F. Sherwood
Andrew W. Zmuda
BY
Bertha L. MacGregor
ATTORNEY United States Patent Office 3,381,701
Patented May 7, 1968

This invention relates to a switchless electrothermal actuator with constant electrical current input.

Electrothermal actuators, of which the construction shown in U.S. Patent No. 3,029,595 is an example, comprise a high pressure casing, a reciprocally mounted shaft having a piston portion in the casing and a work-contacting portion extending beyond the casing, expansible material in the casing, and electrical means for heating the expansible material including means connecting the electrical means to a source of electrical current. Such actuators also include switch mechanism for interrupting the flow of electrical current when the shaft has moved a predetermined distance into work-contacting position by reason of the expansion of the expansible material in the high pressure casing.

Actuators of the kind described in my aforementioned patent are employed to actuate dampers, valves, shutters, pumps and other devices. They depend on switch mechanisms to close the electrical circuit of which the heating element is a part for the purpose of heating the expansible material and causing the reciprocable shaft to be forced outwardly relatively to the high pressure chamber into work-engaging position, and they depend on the switch mechanism to open the circuit at a predetermined time to permit the expansible material to cool and allow the shaft to be retracted by suitable means (not shown).

Failure of the switch mechanism to function properly to open the circuit in electrothermal actuators of the prior art results in overheating and ultimate destruction of the actuator due to the continuous input of electrical current and consequent excessive heating of the heating element and the expansible material with which it is in contact.

In some kinds of installations, it is necessary to hold the shaft in its maximum, work-contacting position for long periods of time, during which the limit switch for controlling the current input is subjected to thousands of consecutive cycles of operation. This frequent operation of the switch mechanism subjects the parts to much wear and tear, and results in oxidation and pitting of contact points, as well as corrosion and arcing. The failure of the limit switch to open the circuit when required results in serious damage to the unit as well as surrounding objects due to the build-up of excessive heat and pressure in the high pressure casing. This presents a particularly troublesome problem in applications where the thermal unit is located in areas difficult to service, for example, when associated with valves which are buried in the ground. In such environments, there is danger of delay in servicing and injurious effects of moisture on the switch mechanisms. Further, it is difficult and costly to completely seal a switch from moisture, which can accumulate through condensation.

For the reasons stated, it is the main object of this invention to produce a switchless electrothermal actuator for imparting motion to mechanism, and to provide means for controlling the generation of heat within the actuator without interrupting the constant flow of electrical current thereto.

The attainment of this object is achieved by eliminating all switch mechanism, and by providing, in association with a switchless electrothermal actuator, a cooling medium such as liquid, refrigerant or air, having temperature lower than that within the thermal actuator, whereby excess heat generated in the actuator is transferred to the cooling medium and carried off thereby.

The embodiment of the invention shown herein is particularly well adapted for the association of our switchless electrothermal actuator with cooling means for controlling the generation of heat within the actuator without interrupting the constant flow of electrical current into the actuator, and at the same time employing the cooling means for other useful purposes. This embodiment comprises a housing in which are mounted the switchless electrothermal actuator and valve mechanism for controlling a flow of water which may be used in sprinkler systems, for irrigation, and other purposes, and also serve as the actuator cooling medium. The housing construction is such that a part of the water flow through the valve portion of the housing is utilized for surrounding the electrothermal unit and for carrying off excess heat from the unit as that part of the flow rejoins the main flow of water through the valve housing to serve for irrigation or other purposes.

Thus it will be understood that the invention may be embodied in structures which comprise (1) our switchless electrothermal actuator and cooling means, per se, or (2) the said switchless actuator and cooling means wherein the actuator imparts motion to a valve or other mechanism which controls the flow of the cooling means. In embodiment (1) the actuator may impart motion to dampers, shutters, valves or other mechanism not associated with the cooling means, as shown in FIG. 7. In embodiment (2), the actuator imparts motion to a valve which controls the flow of a stream of water, part of which constitutes the cooling medium, while the main stream serves for irrigation or other purposes where flowing water is utilized, as shown in FIGS. 1-6 inclusive.

From the foregoing it will be understood that in the operation of our invention there is no variance in the current input to the thermal unit. The current input is predetermined and constant; it is predetermined to be properly related to the temperature of the cooling medium in order to maintain the heat needed in the thermal unit for expanding the expansible material and causing the shaft to function for its intended purpose, while simultaneously preventing overheating and damage to the unit.

For example, if the invention is embodied in a housing which encloses our switchless electrothermal actuator and valve mechanism through which flows a stream of water, for irrigation or other purposes, part of the water being the cooling medium, consideration must be given to the temperature of water available in the area to be served. In the northern part of the United States, water from wells or other sources may have a temperature of about 40° F., whereas in the southern part of the country, water may have higher temperatures up to 90° F. The temperature desired to be maintained in the thermal unit depends on the work load on the shaft. By corelating the electrical current input to the temperature of the cooling medium, the optimum temperature of the thermal unit is maintained without interrupting the current input to the unit and without resorting to rheostats or other devices for controlling the temperature.

Our switchless electrothermal actuator thus maintains the shaft in its maximum stroke position for as long a time as desired without danger of destroying itself through excessive heat, notwithstanding continuous uniform input of electrical current and absence of any switch mechanism for controlling the input.

Another object of the invention is to provide means for manually moving the electrothermal actuator and shaft for the purpose of unseating the valve seat and flushing foreign matter out of the valve and associated plumbing prior to the time the electrical installation is completed.

Another object is to provide throttle means for adjusting the velocity of flow of fluid through the unit. For example, in a sprinkler system the several units may be located at different elevations and therefore require different adjustments to control the pressure of water passing therethrough.

Another object is to so construct the valve seat and valve stem that they are guided for movement in an axial direction, said guiding means serving also to provide a stop which limits the unseating movement of the valve seat.

These and other objects and advantages will become apparent from the drawings and following specification.

In the drawings:

FIG. 1 is a longitudinal vertical sectional view of a switchless electrothermal actuator embodying my invention.

FIG. 2 is a top plan view of the construction shown in FIG. 1.

FIG. 3 is an elevational view of the right hand end of the device and FIG. 4 is an elevational view of the left hand end of the device as shown in FIG. 1.

FIG. 5 is a transverse sectional view in the plane of the line 5—5 of FIG. 1.

FIG. 6 is a transverse sectional view in the plane of the line 6—6 of FIG. 1.

FIG. 7 is a fragmentary vertical sectional view of a modified form of construction.

In that embodiment of the invention shown in FIGS. 1–6 of the drawings, our switchless electrothermal actuator is designed to operate a valve for controlling a flow of water. The structure may be installed in a sprinkler system, for irrigation or other purposes. In this embodiment, the stream of water which passes through the device for other purposes also serves as the cooling medium for preventing overheating of the actuator.

The electrothermal actuator comprises a high pressure casing 10, shown as cylindrical in form, but it need not be confined to that particular form. The casing 10 is hollow to provide a chamber 11 which contains expansible material such as wax, for example, which has good expansion properties when subjected to heat. An electrical heating element 12 is located in the chamber 11, and is connected to electrodes 13 and electrical current wires 14 leading to a source of current. A block of insulation material is designated 15. A shaft 16 is reciprocally mounted in the casing, its piston portion being located in the chamber 11 and its work contacting portion extending outwardly beyond the end of the casing, through a piston seal 17, bearing 18, and lubricant seal 19, retained in position by an externally threaded end casing 20 which engages the threads 21 in the casing 10, whereby the end of the chamber 11 is sealed.

The diameter of the work contacting portion of the shaft 16 is enlarged by a cap 22 fitted on and rigidly secured to the end of the shaft which extends beyond the end casing 20. An O-ring 23 located in a groove in the casing 20 surrounds the shaft 16 to prevent fluid from entering the actuator casing 10.

A metal ring 24 surrounds the insulation block 15 and is flanged as indicated at 25 to extend around the adjacent end of the actuator housing 10. An O-ring 26 is seated in a groove in the ring 24.

The actuator unit 10 is located in a housing indicated as a whole at 30. The end of the housing toward the left of FIG. 1 is cylindrical in shape and adapted to receive the insulation block 15 and adjacent end of the actuator casing 10 which fit slidably therein.

An externally screw threaded, manually operable member 31, which will be referred to herein as the actuator pusher, abuts the ring 24. The pusher is centrally bored to accommodate the current wires 14. The pusher is held in place by an internally threaded cap 32 which engages the threads on the pusher 31 and on the cylindrical end 30' of the housing 30, thus holding the said parts in assembled relationship. The function of the pusher will be described hereinafter.

The housing 30 has a larger diameter in the area designated 33 to space its cylindrical wall from the actuator casing 10 to provide an annular space 34 around the actuator casing for circulation of a cooling medium. The housing 30 also is provided with a longitudinal projection 35 in which is located a suction passageway or cooling medium by-pass 36.

To the right of the cylindrical portion 33 and annular wall 37', the housing 30 is enlarged as indicated at 37 to provide a fluid intake chamber 38, internally threaded intake collar 39, fluid chamber 40, and threaded outlet member 41. The passage 36 communicates with the space 34 and chamber 40. The intake chamber 38 is defined by a wall 42 which separates the chamber 38 from the fluid chamber 40 and outlet 41. The chamber 38 houses valve mechanism. The wall 42 has an opening 43 therein, surrounded by a valve seat 44, on which is seated the valve 45. A coiled spring 46 bears at one end on the metallic portion of the valve 45 to hold the annular resilient portion 47 firmly against the seat 44. The opposite end of the spring 46 bears against a cap 48 which has threaded engagement with the internally threaded collar 49 integral with the housing 30.

The valve 45 has a centrally located bearing member 50 on the surface which faces the fluid chamber 40, said bearing member 50 being designed to receive bearing thrust of the shaft 16–22 when the actuator is in operation for the purpose of forcing the valve 45 away from the seat 44, as will be explained hereinafter. The movement of the valve 45 is guided by a stem 51 connected to the valve and slidable in the sleeve 52 and bore 53 of the cap 48. The inner end of the sleeve 52 functions as a stop for travel of the valve 45.

The cap 48 has formed on its inner surface an arcuate vane 54 as shown in FIGS. 1 and 3 for controlling the velocity of the fluid flowing into the chamber 38. The position of the vane 54 can be adjusted by turning the cap 48 and tightening the set screw 55. If the cap is turned so that the vane is located directly in the path of the incoming fluid, the velocity and pressure of the fluid is decreased as compared to the condition when the vane is located to one side of the intake 39.

In the modification shown in FIG. 57, 60 indicates part of a main housing comparable to the housing 30 heretofore described, but in this modification the cooling medium does not pass through a valved chamber. The actuator shaft 61 moves through the fluid chamber in the housing 60 and into a steam valve chamber 62 located outwardly of the main housing 60. A steam valve 63 is shown diagrammatically, but the chamber 62 may contain other mechanism to be actuated by the actuator shaft 61. The inlet for the cooling medium is indicated at 64 and the outlet at 65. A suction passageway or by-pass 66 communicates with the interior of the housing 60 and also with the cooling medium space 34 which surrounds the actuator casing 10 as heretofore described in connection with FIGS. 1–6. This arrangement shown in FIG. 7 is designed for installations where it is not practical to utilize a cooling medium which serves as such and also serves some other purpose. Due to the fact that the temperature of steam is higher than that of a cooling medium, the construction shown in FIG. 7 provides for circulation of a separate cooling medium in the housing 60, not associated with the work to be performed by the actuator shaft when operating a steam valve located outside of the cooling chamber.

The operation of the mechanism shown in FIGS. 1–6 is as follows:

Before putting the actuator into operation, it may be desirable to clean the valve mechanism, as pointed out in the statement of objects of this invention. For this purpose, the pusher 31 is turned manually relatively to the cap 32 to force the actuator casing 10 and its contents, including also the shaft 16–22, into valve actuating position. The actuator 10 can be moved manually until it contacts the wall 37'. This movement opens the valve, forcing the valve 45 away from its seat 44, and permitting water to flow through the chambers 38 and 40, to flush the interior. Then the pusher 31 is manually turned to restore its original position and the valve spring 46 forces the valve 45 into seated position.

The device is installed for operation by connecting water inlet and water outlet lines to the threaded collars 39 and 41, respectively, and connecting the electrical current wires 14 to a source of current. As soon as the expansible material in the chamber 11 expands sufficiently to force the shaft 16 to move outwardly, the shaft portion 22 contacts the bearing member 50 of the valve 45 and opens the valve so that water can flow from the intake chamber 38 into the fluid chamber 40 (some passing into the space 34 and passageway 36), and out through the outlet 41. As the water flows past the port of the by-pass 36 it has a suctional effect on the water in the passage 36 and thus produces circulation of water in the space 34 around the actuator casing 10.

The voltage of the current passing into the heating element 12 is corelated to the temperature of the water stream entering the housing 30. As heretofore pointed out, water from streams and underground sources varies from 40° to 90° F. in different parts of the United States. After the desired voltage has been determined (average 24 watts), the current input to the actuator need not be interrupted because the cooling medium passing through the space 34 and passage 36 maintains the temperature at a safe maximum limit so as to avoid overheating and damaging the unit. Thus the valve 45 is held in open position as long as it is desired to operate the sprinkler system or other mechanism through which the water stream is passing.

The operation of the actuator shown in FIG. 7 is similar to that just described, excepting that the cooling medium functions as such, per se, without having an additional function such as described in connection with FIGS. 1–6. In FIG. 7, the actuator shaft operates a steam valve or other mechanism which does not require a water stream in its operation, as does a valved sprinkler system.

The cap 48 and vane 54 thereon are adjusted by means of the set screw 55, to control the intake of water into the chamber 38. This adjusting means is particularly useful when the unit is part of an irrigation system, wherein the described units are located at different elevations due to the nature of the terrain.

From the foregoing it will be understood that switches and other devices for varying or interrupting the constant flow of current into the actuator have been eliminated from the electrothermal actuator of our invention, and that the controlling of the selected temperature of the actuator is achieved by corelating the electrical current input with the temperature of the cooling medium employed to be circulated around the actuator without interruption of the current input.

In describing the invention, reference has been made to particular examples embodying the same, but we wish it to be understood that the invention is not limited to the constructions shown in the drawing and that various embodiments may be selected, and changes made in the construction and general arrangement of parts without departing from the invention.

We claim:

1. A switchless electrothermal actuator for imparting motion to mechanism, comprising
    (a) a high pressure casing containing expansible and contractible material and a reciprocal shaft having a piston portion in the casing and a work-contacting portion extending beyond the casing,
    (b) an electrical heating element in the casing and a constant electrical current input connected to said element for heating the expansible material and actuating the shaft,
    (c) a valve housing surrounding and enclosing the high pressure casing in spaced relationship thereto for circulation of a cooling medium between the casing and housing for cooling the casing and its contents,
    (d) a fluid inlet and a fluid outlet in the housing, and
    (e) a cooling medium in the housing having temperature lower than the temperature of the high pressure casing when heated by the heating element, said cooling medium circulating through the space between the casing and housing in heat extracting relationship to the exterior of the casing walls for controlling the temperature of the casing and expansible material without means for varying or interrupting the constant flow of electrical current thereto.

2. The actuator defined by claim 1, which includes a suction passageway in the housing wall communicating at one end with the space in which the cooling medium circulates between the casing and housing, and communicating at its other port end with the interior of the housing near the fluid outlet, said suction passageway being a by-pass which promotes circulation of the cooling medium when the cooling medium passes through the housing past the port end of the suction passageway to the fluid outlet.

3. A switchless electrothermal actuator for actuating valve mechanism, comprising
    (a) a high pressure casing containing expansible and contractible material and a reciprocal shaft having a piston portion in the casing and a work-contacting portion extending beyond the casing,
    (b) an electrical heating element in the casing and a constant electrical current input connected to said element for heating the expansible material and actuating the shaft,
    (c) a valve housing surrounding and enclosing the high pressure casing in spaced relationship thereto for circulation of a cooling medium between the casing and housing for cooling the casing and its contents,
    (d) a wall in the housing defining a valve chamber having an opening therein in axial alignment with the shaft and communicating with the interior of the housing,
    (e) valve mechanism closing said opening actuated by the shaft,
    (f) a fluid inlet in the housing leading to the valve chamber,
    (g) a fluid outlet in the housing, and
    (h) a cooling medium in the housing having temperature lower than the temperature of the high pressure casing when heated by the heating element, said cooling medium entering the housing through said valve chamber when the valve has been actuated by the shaft, circulating through the space between the casing and housing in heat extracting relationship to the exterior of the casing walls for controlling the temperature of the casing and expansible material without means for varying or interrupting the constant flow of electrical current thereto and passing through the housing to the outlet to serve outwardly of the housing for purposes other than as a cooling medium within the housing.

4. The actuator defined by claim 3, which includes a suction passageway in the housing wall communicating at one end with the space in which the cooling medium circulates between the casing and housing, and communicating at its other port end with the interior of the housing near the fluid outlet, said suction passageway being a by-pass which promotes circulation of the cooling medium when the cooling medium passes through the housing past the port end of the suction passageway to the fluid outlet.

5. The actuator defined by claim 3, which includes an adjustable cap mounted externally on the valve housing for urging the valve into closed position, said cap being provided with a vane in the valve chamber, and means for adjusting the position of the cap and vane relatively to the fluid inlet for altering the velocity of the fluid entering the housing.

6. A switchless electrothermal actuator for actuating valve mechanism, comprising
(a) a high pressure casing containing expansible and contractible material and a reciprocal shaft having a piston portion in the casing and a work-contacting portion extending beyond the casing,
(b) an electrical heating element in the casing and a constant electrical current input connected to said element for heating the expansible material and actuating the shaft,
(c) a main housing enclosing the high pressure casing in spaced relationship thereto for circulation of a cooling medium between the casing and housing for cooling the casing and its contents,
(d) a wall in the housing defining a valve chamber having an opening therein in axial alignment with the shaft and communicating with the interior of the housing,
(e) valve mechanism closing said opening actuated by the shaft,
(f) a fluid inlet in the housing leading to the valve chamber,
(g) a fluid outlet in the housing,
(h) a cooling medium in the housing having temperature lower than the temperature of the high pressure casing when heated by the heating element, said cooling medium entering the housing through said valve chamber when the valve has been actuated by the shaft, circulating through the space between the casing and housing for controlling the temperature of the casing and expansible material without means for varying or interrupting the constant flow of electrical current thereto, and passing through the housing to the outlet to serve outwardly of the housing for purposes other than as a cooling medium within the housing,
(i) and manually operable means for pushing the high pressure casing and shaft relatively to the housing toward the valve and thereby moving the shaft into valve opening position to permit flushing of the valve when the actuator is not in operation.

7. A switchless electrothermal actuator for actuating valve mechanism, comprising
(a) a high pressure casing containing expansible and contractible material and a reciprocal shaft having a piston portion in the casing and a work-contacting portion extending beyond the casing,
(b) an electrical heating element in the casing and a constant electrical current input connected to said element for heating the expansible material and actuating the shaft,
(c) a main housing enclosing the high pressure casing in spaced relationship thereto for circulation of a cooling medium between the casing and housing for cooling the casing and its contents,
(d) a wall in the housing defining a valve chamber having an opening therein in axial alignment with the shaft and communicating with the interior of the housing,
(e) valve mechanism closing said opening actuated by the shaft,
(f) a fluid inlet in the housing leading to the valve chamber,
(g) a fluid outlet in the housing,
(h) a cooling medium in the housing having temperature lower than the temperature of the high pressure casing when heated by the heating element, said cooling medium entering the housing through said valve chamber when the valve has been actuated by the shaft, circulating through the space between the casing and housing for controlling the temperature of the casing and expansible material without means for varying or interrupting the constant flow of electrical current thereto, and passing through the housing to the outlet to serve outwardly of the housing for purposes other than as a cooling medium within the housing,
(i) and a vane in the valve chamber and means for adjusting the position of the vane relatively to the fluid inlet for altering the velocity of the fluid entering the housing.

References Cited

UNITED STATES PATENTS

| | | | |
|---|---|---|---|
| 1,587,921 | 6/1926 | Ray | 137—339 |
| 1,697,432 | 1/1929 | Martin | 236—68 |
| 1,905,683 | 4/1933 | Carraway | 236—68 |
| 1,994,728 | 3/1935 | Persons | 251—11 |
| 2,114,961 | 4/1938 | Gille | 137—339 |
| 2,433,493 | 12/1947 | Turner | 251—11 |
| 2,444,703 | 7/1948 | Jones | 137—340 |
| 3,169,008 | 2/1965 | Whitlock | 251—11 |
| 3,245,427 | 4/1966 | Porwit et al. | 137—339 |
| 3,266,235 | 8/1966 | Carlson | 251—11 |

M. CARY NELSON, *Primary Examiner.*

S. SCOTT, *Assistant Examiner.*